United States Patent
Lorgouilloux et al.

(10) Patent No.: US 10,717,928 B2
(45) Date of Patent: Jul. 21, 2020

(54) MIXED CALCIUM AND MAGNESIUM COMPOUND AND METHOD FOR PRODUCING SAME

(71) Applicant: S. A. Lhoist Recherche et Developpement, Ottignies-Louvain-la-Neuve (BE)

(72) Inventors: Marion Lorgouilloux, Strepy Bracquegnies (BE); Alain Laudet, Namur (BE)

(73) Assignee: S.A. Lhoist Recherche et Developpement, Ottignies-Louvain-La (BE)

( * ) Notice: Subject to any disclaimer, the term of this patent is extended or adjusted under 35 U.S.C. 154(b) by 550 days.

(21) Appl. No.: 14/406,988

(22) PCT Filed: Jul. 12, 2013

(86) PCT No.: PCT/EP2013/064759
§ 371 (c)(1),
(2) Date: Dec. 10, 2014

(87) PCT Pub. No.: WO2014/009508
PCT Pub. Date: Jan. 16, 2014

(65) Prior Publication Data
US 2015/0184078 A1 Jul. 2, 2015

Related U.S. Application Data

(60) Provisional application No. 61/696,948, filed on Sep. 5, 2012.

(30) Foreign Application Priority Data

Jul. 12, 2012 (BE) .................. 2012/0485

(51) Int. Cl.
*C09K 21/02* (2006.01)
*C04B 2/00* (2006.01)
*C04B 2/04* (2006.01)
*C01F 11/02* (2006.01)
*C01F 5/14* (2006.01)

(52) U.S. Cl.
CPC ................ *C09K 21/02* (2013.01); *C01F 5/14* (2013.01); *C01F 11/02* (2013.01); *C04B 2/00* (2013.01); *C04B 2/04* (2013.01); *C01P 2002/88* (2013.01); *C01P 2004/82* (2013.01); *C01P 2006/12* (2013.01); *C01P 2006/14* (2013.01); *C01P 2006/16* (2013.01); *Y10T 428/2982* (2015.01)

(58) Field of Classification Search
CPC . C09K 21/02; C01F 5/14; C01F 11/02; C01B 13/14; C04B 2/00; C04B 2/04
See application file for complete search history.

(56) References Cited

U.S. PATENT DOCUMENTS

| | | | | |
|---|---|---|---|---|
| 1,277,855 | A | * 9/1918 | Carson | ............ C01C 1/18 423/266 |
| 2,224,780 | A | 10/1940 | Chesny | |
| 2,912,306 | A | 11/1959 | Kippe | |
| 5,422,092 | A | 6/1995 | Miyata | |
| 5,705,141 | A | * 1/1998 | Dumont | ............ B01D 53/502 423/636 |
| 2006/0275203 | A1 | 12/2006 | Chavez et al. | |
| 2007/0107637 | A1 | 5/2007 | Gambin et al. | |

FOREIGN PATENT DOCUMENTS

| | | |
|---|---|---|
| EP | 0230139 A1 | 7/1987 |
| EP | 0659684 A1 | 12/1993 |
| EP | 0623555 A1 | 9/1994 |
| JP | 4722942 | 6/1972 |
| JP | 688075 | 3/1994 |
| JP | 06316662 A | 11/1994 |
| JP | 1025112 A | 1/1998 |
| JP | 2005320207 A | 11/2005 |
| WO | 98/51614 A1 | 11/1998 |

OTHER PUBLICATIONS

PCT/2013/064759 International Search Report, Oct. 8, 2013, 3 pages, European Patent Office.

* cited by examiner

*Primary Examiner* — James A Fiorito
(74) *Attorney, Agent, or Firm* — Whitaker Chalk Swindle & Schwartz PLLC; Charles D. Gunter, Jr.

(57) ABSTRACT

A method for producing a mixed calcium and magnesium compound comprising the slaking of quicklime with a magnesium hydroxide suspension, forming solid particles, said slaking by non-wet means forming said solid particles comprising a calcium phase and a magnesium phase intimately bonded to each other and of homogeneous volume distribution, and a mixed compound comprising a calcium phase and a magnesium phase.

12 Claims, 2 Drawing Sheets

MIXED CALCIUM AND MAGNESIUM COMPOUND AND METHOD FOR PRODUCING SAME

The present invention relates to a mixed calcium and magnesium compound and its manufacturing method.

Mixed calcium and magnesium compounds are disclosed in documents U.S. Pat. No. 5,422,092 and EP 0 623 555 which describe composite materials of formula $Ca_{(1-x)}M^{2+}{}_x(OH)_2$ in which M may represent magnesium from among the list of quoted metals. These composite materials are obtained as a solid solution of metal hydroxide, for example calcium hydroxides in which in the crystalline structure, Mg or another metal is substituted for a calcium atom. Conversely, a solid solution of magnesium hydroxide may also be obtained, in which magnesium atoms are substituted for calcium atoms in the crystalline structure.

In order to obtain such composite materials, the metal, for example magnesium, is added to a suspension of calcium hydroxide, for example a suspension of slaked lime, in the form of magnesium chloride, in an autoclave at 120° C. for 2 hours.

Slaked lime consists of a set of solid particles, mainly calcium di-hydroxide of formula $Ca(OH)_2$, and is the industrial result of slaking quicklime with water, a reaction also called hydration. This product is also known under the name of hydrated lime. Subsequently, calcium di-hydroxide will simply be called calcium hydroxide.

Depending on the amount of excess water applied, there exist many possibilities for industrially obtaining slaked lime from initial quicklime (see notably Boynton, R S, Chemistry and Technology of Lime and Limestone, second ed., New York; Wiley, 1980, xii, pp. 327-328). The slaking mode also determines the form in which appears slaked lime: dry hydrate, slurry, suspension/lime milk.

In a slaking mode "via a dry route", the amount of added water is limited to that which is required for the slaking reaction, increased with the amount lost as steam because of the exothermic nature of the reaction. Upon exiting the hydrator, the obtained product is powdery and generally comprises both at least 2% of residual non-hydrated CaO and less than 2% of humidity, with a maximum of 4% of humidity. It may be packaged and sold directly, after optional steps for controlling grain size, but without any preliminary drying and de-agglomeration step.

In a previous slaking mode alternative, the hydration may be achieved with a larger excess of water according to WO 97/14650. In this case, the obtained hydrate contains humidity of the order of 15 to 30% by mass. Because of this humidity, the hydrated lime requires a drying and de-agglomeration step before storage and transport. The drawback of adding a drying/de-agglomeration step in the production line is compensated by the fact that the water excess used during the reaction allows development of the specific surface area and of the porous volume of the hydrate which may then, by means of these characteristics, be used in specific applications, notably for the treatment of acid gases. This slaking mode according to WO 97/14650, will be called a slaking mode via a "quasi-dry route".

In a slaking mode <<by a wet route>>, the amount of added water is in very large excess as compared with the amount strictly required for the slaking reaction. A <<lime milk>> is then obtained, i.e. an aqueous suspension of slaked lime particles.

When the amount of water used for the slaking reaction is a little smaller, the obtained product is pasty and this is referred to as slaking <<via a putty route>> (lime putty).

In the present document, a slaking mode <<via a non-wet route>> will designate slaking modes, grouping slaking modes via a dry route, via a quasi-dry route and any intermediate between both of them (a hydrate obtained with a humidity comprised between 2 and 15%) excluding the two slaking modes via a humid route and via a slurry route.

By quicklime is meant a mineral solid material for which the chemical composition is mainly calcium oxide, CaO. Quicklime is commonly obtained by calcination of limestone, mainly consisting of $CaCO_3$. Quicklime contains impurities, i.e., compounds such as magnesium oxide, MgO, silica, $SiO_2$ or further alumina $Al_2O_3$, etc. . . . , in an amount of a few percent. It is understood that these impurities are expressed in the aforementioned forms and may in reality appear as different phases. It also generally contains a few percent of residual $CaCO_3$, called unfired elements.

In addition to limestone deposits (calcium carbonate of formula $CaCO_3$), there exist dolomite deposits (mixed calcium and magnesium carbonate of formula $CaCO_3.MgCO_3$) or of any other mixed calcium and magnesium carbonate. Just like the limestone, dolomites or other aforementioned mixed carbonate may be calcined, thereby producing quick dolomite of formula $CaO.MgO$ or any other mixed calcium and magnesium oxide. In the same way as for quicklime, a hydration reaction will be initiated when quick dolomite or another aforementioned mixed oxide is put into contact with water. However, it is known that the reactivity of magnesium oxide is much lower than that of quicklime which is very hydrophilic. The hydration of these quick compounds is much more complicated than the hydration of quicklime.

For this reason, in the large majority of cases, the hydrated dolomite or any other mixed calcium and magnesium hydroxide industrially produced via a dry route is in reality a dolomite semi-hydrate or any other aforementioned mixed hydroxide, containing a non-negligible amount of residual non-hydrated MgO. The aforesaid dolomite semi-hydrate is generally represented by the formulae $Ca(OH)_2.MgO$ or $Ca(OH)_2.Mg(OH)_2.MgO$ depending on the hydration level of the magnesium oxide. The other aforementioned mixed hydroxides have formulae of the same type, but with different calcium/magnesium molar ratios.

In order to overcome this low reactivity of quick dolomite or of any other aforementioned quick compound with regard to water for the purpose of obtaining totally hydrated products (of general formula $Ca(OH)_2.bMg(OH)_2$), resorting to a clearly greater amount of water than the amount of water used for dry slaking and/or to higher temperatures than those at which occur the standard hydration reaction for quicklime, to milling of the quick dolomite or of any other aforementioned quick compound before its hydration, or even to a hydrothermal reaction, i.e. a pressurised hydration at a high temperature (in steam, 7-13 bars, 115-165° C.) (Boynton, pp 325-326) is known. A dolomite product of this type, totally hydrated is known as Type S, a term to be opposed to Type N which represents normal i.e. partly hydrated, dolomite hydrates, (Oates, J A H, Lime and Limestone, Weinheim: Wiley-VCH, 1998, pp. 222-223).

In every case, these safety methods are complicated and costly, with the risk that a portion of the MgO is not well hydrated.

Whether these are totally or semi-hydrated dolomites or any other aforementioned mixed hydroxide, the Ca/Mg ratio in the product is sustained and corresponds to the Ca/Mg molar ratio of initial crude dolomite or of any other aforementioned mixed carbonate.

Document EP 0 558 522 in the name of the applicant provides the production of a calcium and magnesium hydroxide from dolomite for which the Ca/Mg ratio is therefore set and close to 1, which, in order to be totally hydrated, is first finely milled and then hydrated with an excess of water (mass ratio between the water, on the one hand, and CaO and/or MgO, on the other hand, of 2.5) at a high temperature (>80° C.).

The initial dolomite mixed compound has a specific surface area greater than 35 m$^2$/g and a humidity level of less than 50% by weight. This product is obtained in the presence of an additive selected from ethylene glycol, diethylene glycol, triethylene glycol, monoethanolamine, diethanolamine, triethanolamine and mixtures thereof. This document is on the other hand silent as to the obtained porous volume.

Document U.S. Pat. No. 3,869,299 discloses a method allowing production of a totally hydrated dolomite at atmospheric pressure. This method resorts to a great excess of hot water (hydration via a humid route giving rise to obtaining a dolomite milk) (50-100° C., preferably 90-100° C.) and to the use of an additive based on boron. The hydration duration may attain up to 10 hours. The Ca/Mg ratio is sustained and systematically close to equimolarity since these are natural dolomites.

The addition of a compound based on boron during hydration allows development of the porosity and of the specific surface area of the magnesium hydroxide alone, as compared with similar hydration without adding a compound based on boron.

For various applications, there exits a need on an industrial scale for mixed calcium and magnesium hydrates which are totally hydrated, for which the composition (calcium and magnesium proportions) is controlled and variable and in which the calcium and magnesium compounds are intimately combined. These hydrates are mixed calcium and magnesium hydroxides, associated with impurities of the CaO, CaCO$_3$, Al$_2$O$_3$, SiO$_2$, Fe$_2$O$_3$ type . . . .

More particularly, the present invention relates to a method for making a calcium and magnesium mixed compound comprising slaking of quicklime with an aqueous medium, with formation of solid particles.

Such a method is known from document SU1065341, which as for it, describes the preparation of lime suspensions hydrated by hydration of a quicklime with water in the presence of chloride-free waste waters and of Mg(OH)$_2$. Mg(OH)$_2$ is used for reducing i) the losses of active CaO by limiting the evolvement of heat at the beginning of the hydration reaction and by promoting complete hydration of the CaO particles, even of the less reactive particles, ii) the viscosity of the suspension and iii) the concentration of impurities in the obtained suspension. Mg(OH)$_2$ is added into the hydration water before hydrating the quicklime, in an amount from 3 to 9% of the available mass of CaO in the mother lime. The limes used in the examples are highly impure limes only containing 72% of available CaO, the remainder being inactive CaO, CaCO$_3$ and impurities.

Such a method is also known for example from document WO98/51614 which discloses different production routes of such a mixed compound with the purpose of providing a solution allowing acceleration and therefore improvement in the capture of large amounts of acids, of metals and anions in waste waters, as compared with capture obtained by using a suspension of standard magnesium hydroxide for treating these waters. The relevant solution amounts to using a suspension of a magnesium compound, such as Mg(OH)$_2$, modified by adding 5 to 30% of a calcium compound, i.e. inter alia, Ca(OH)$_2$, based on the mass of Mg(OH)$_2$.

This modified suspension may be obtained, as mentioned earlier in different ways. First of all, one of the described routes amounts to hydrating together and under pressure, in the presence of mandatory additives, a mixture of calcium and magnesium sources, i.e. MgO and CaO. After stabilisation, sifting and de-agglomeration, a suspension is obtained which contains 55-65% of dry material, based on the total weight of the composition.

Next, another described route consists of hydrating at atmospheric pressure, for very long durations and with mandatory additives, a mixture of calcium and magnesium sources, such as MgO and CaO.

Finally, a last route is described, in which a mixed compound is obtained by mixing a calcium CaO source with a diluted magnesium suspension of Mg(OH)$_2$ prepared beforehand by any of the techniques known for producing Mg(OH)$_2$ suspensions and containing 50-60% by weight of solid fraction based on the total weight of the suspension. After adding the CaO source, stirring of the suspension allows hydration of the CaO source and the formation of Ca(OH)$_2$.

Only example 1 of this document describes the production of such an Mg(OH)$_2$ suspension modified by the presence of Ca(OH)$_2$, the other examples describing the use of the suspension for treating a water.

However, this document does not disclose the obtaining of dry mixed compounds in a powdery state, the obtained compounds being always disclosed as a suspension.

However, it was found that there exists a need for producing in a simple and inexpensive way, calcium and magnesium mixed compounds essentially as dry hydroxides which appear as powders having a humidity of less than 30% by weight, like for example compounds which may be used as flame retardants and for which the Ca/Mg ratio is variable and controlled while being able to have a specific surface area and a controlled porous volume depending on the contemplated applications.

The object of the invention is to overcome the drawbacks of the state of the art by providing a method allowing production of mixed calcium and magnesium compounds with a variable and controlled Ca/Mg ratio and with a controllable specific surface area and porous volume, for which energy consumption is reduced and not requiring any specific infrastructure thereby reducing the cost of the compound so as to allow wide use, including fields with smaller added value.

In order to solve this problem, according to the invention provision is made for a method as indicated at the beginning, characterized in that said aqueous medium is a suspension of magnesium hydroxide and in that solid particles are particles of a mixed compound of formula xCa(OH)$_2$.yMg(OH)$_2$.zI comprising a calcium phase and a magnesium phase, intimately bound and with a homogenous volume dissolution, and wherein x, y and z are weight fractions wherein x+y is comprised between 88 and 100% by weight based on the total weight of the mixed compound and wherein I represents impurities.

The solution envisioned according to the present invention therefore consists of slaking quicklime in a conventional hydrator via a non-wet route with a suspension of Mg(OH)$_2$. This solution has various advantages as compared with the method described earlier, for producing mixed compounds based on totally hydrated calcium and magnesium. Indeed, it gives the possibility of varying in a controlled way the Ca/Mg ratio in the production of hydrates. This ratio Ca/Mg is on the other hand sustained in dolomite hydrates, since it is set by the composition of the original dolomite.

Further, with the method according to the invention, the magnesium is already in the form of a hydroxide. Therefore, slaking exclusively relates to calcium oxide, much more reactive in the presence of water unlike MgO for which hydration is difficult.

During slaking of CaO for forming $Ca(OH)_2$, particles of $Mg(OH)_2$ are incorporated into the formed calcium hydroxide without there being any substitution at the crystal lattice.

The method according to the invention also allows flexibility as to the specific surface area and to the porous volume of the double hydroxide, those of totally hydrated dolomite generally only being of the order of 15-25 $m^2/g$ and of the order of 0.05-0.15 $cm^3/g$, respectively.

In the following, by <<specific surface area>> or <<BET specific surface area>> is meant the specific surface area measured by nitrogen adsorption manometry and calculated by the BET method and by <<porous volume>> or <<BJH porous volume>> is meant the volume of the pores with a size from 17 to 1,000 Å, as measured by nitrogen adsorption manometry and calculated by the BJH method, on the other hand. The sizes of particles as for them are determined by laser grain size determination.

Advantageously, the method according to the present invention comprises before said slaking of quicklime, a preparation of said magnesium hydroxide milk by suspending in water a predetermined amount of solid magnesium hydroxide, comprised between 1 and 55% by weight based on the weight of said magnesium hydroxide suspension.

In an alternative, the provision of magnesium hydroxide milk for the slaking reaction of quicklime is achieved from an, either diluted or not, commercial magnesium hydroxide milk.

The $Mg(OH)_2$ milk or suspension is an aqueous suspension of solid $Mg(OH)_2$ particles. Its dry material content is very variable and is comprised between 1 and 55% by weight, preferably between 5 and 53% by weight, preferably between 10 and 40% by weight and more advantageously between 20 and 30% by weight.

$Mg(OH)_2$ is a common industrial product, sold as a milk or as a powder, which stems from separation and drying of such a milk.

The solid fraction of the magnesium hydroxide milk used in the method according to the invention contains at least 88% by weight of $Mg(OH)_2$, in particular at least 90%, preferably at least 92% by weight and advantageously at least 95% by weight of $Mg(OH)_2$, the remainder being as impurities ($CaO$, $Al_2O_3$, $SiO_2$, $Fe_2O_3$ ...) and of MgO for which the content is less than 2%, advantageously less than 1% and preferably less than 0.5% of MgO.

The specific surface area of the solid fraction of magnesium hydroxide milk is comprised between 5 and 15 $m^2/g$, preferably between 5 and 10 $m^2/g$, advantageously between 6 and 8 $m^2/g$. Its porous volume is comprised between 0.02 and 0.05 $cm^3/g$, preferably between 0.02 and 0.04 $cm^3/g$, advantageously between 0.02 and 0.03 $cm^3/g$. This solid fraction has a $d_{90}$ comprised between 5 and 20 μm, preferably <15 μm, advantageously <10 μm and a $d_{50}$ comprised between 2 and 10 μm, preferably <8 μm, advantageously <5 μm.

The notation $d_x$ represents a diameter, expressed in μm, relatively to which X % of the measured particles are smaller.

In a particular embodiment, said slaking of quicklime is achieved via a dry route.

In another particular embodiment of the invention, said slaking of quicklime is achieved by a quasi-dry route and is followed by a drying and de-agglomeration step.

The method according to the present invention advantageously comprises further a step for grain size cut-off.

In a particularly advantageous embodiment of the method according to the invention, said magnesium hydroxide amount is comprised between 5 and 53% by weight, preferably between 10 and 40% by weight, in particular between 20 and 30% by weight, based on the total weight of the magnesium hydroxide milk.

Further, in a particular advantageous embodiment, said quicklime consists of particles for which the size is comprised between 10 μm and 10 mm, preferably entirely passing through a 5 mm sieve, and more particularly a 2 mm sieve.

In still another embodiment, said aqueous medium further comprises an additive selected from the group of additives increasing the specific surface area of $Ca(OH)_2$ particles of said mixed compound as well as alcohols, amines and the like.

These additives are for example selected from ethylene glycol, diethylene glycol, triethylene glycol, monoethanolamine, diethanolamine, triethanolamine and mixtures thereof.

In a particular embodiment, said aqueous medium comprises an additive of the fatty acid type, in particular a stearate and more advantageously calcium stearate. Indeed, in certain applications which may be contemplated for the mixed compound according to the present invention, notably applications as fillers in polymers and in particular as a flame retardant filler in polymers, such additives are generally used as surface agents or coupling agents. They are required for treating the charge at the surface in order to improve the compatibility of the charge and of the polymeric matrix.

These coupling agents are generally added to the filler in an independent step of the method for manufacturing polymeric parts, by intensive mixing between the filler and the coupling agent. According to the present invention, such a coupling agent may be added into the magnesium hydroxide suspension, which amounts to achieving a surface treatment in situ during the synthesis of the mixed compound according to the invention with the purpose of using it as a filler.

Other embodiments of the method according to the invention are indicated in the appended claims.

The object of the invention is also a powdery mixed compound comprising a calcium phase and a magnesium phase in solid and powdery form, characterized in that it has the general formula $xCa(OH)_2 \cdot yMg(OH)_2 \cdot zI$, and wherein said calcium phase and said magnesium phase are intimately bound and with a homogeneous volume of the solution, and wherein x, y and z are weight fractions wherein x+y is comprised between 88 and 100% by weight based on the total weight of the mixed compound and wherein I represents impurities.

In the mixed compound according to the invention, the size of the particles $d_{97}$ is less than 250 μm, preferably less than 200 μm, advantageously less than 90 μm and more particularly less than 60 μm.

Advantageously, the mixed compound according to the invention is in the form of a dry hydrate having a relative humidity level of less than 4% by weight, preferably less than 2% by weight, more preferentially less than 1% by weight, based on the total weight of the mixed compound.

In the mixed compound according to the invention in the form of said dry hydrate, the $Mg(OH)_2$ content is comprised between 0.4 and 48% by weight, preferably between 0.5 and 43% by weight, more particularly between 0.6 and 40% by weight, based on the total weight of the compound and the $Ca(OH)_2$ content is comprised between 40 and 99.6% by weight, preferably between 45 and 99.5% by weight, more particularly between 48 and 99.4% by weight based on the total weight of the mixed compound.

In this way, the $Mg(OH)_2$ proportion based on the mass of $Ca(OH)_2$ in the mixed compound according to the invention is comprised between 0.4 and 120%. Preferably, this proportion is comprised between 5 and 80%, in particular between 10 and 60% and in a particular case between 30 and 50%. Conversely, the proportion of $Ca(OH)_2$ based on the mass of $Mg(OH)_2$ in the mixed compound according to the invention is fairly comprised between 80 and 25,000%. Preferably, it is comprised between 125 and 2,000%, in particular between 165 and 1,000% and in a particular case between 200 and 350%.

Advantageously, the dry hydrate according to the invention has a BET specific surface area comprised between 5 and 20 $m^2/g$, preferably greater than 10 $m^2/g$ and in particular between 13 and 17 $m^2/g$.

Particularly, the dry hydrate according to the invention has a BJH porous volume comprised between 0.02 and 0.1 $cm^3/g$, preferably greater than 0.03 $cm^3/g$ and advantageously between 0.04 and 0.07 $cm^3/g$.

In an alternative according to the present invention, the mixed compound has a humidity level between 15 and 30% by weight, preferably greater than 17%, or advantageously greater than 19% by weight based on the weight of said mixed compound, in the form of a wet hydrate and has a humidity of less than 4%, preferably less than 2%, or even less than 1%, after drying.

Advantageously, the mixed compound obtained via a quasi-dry route according to the invention has on a dry basis, an $Mg(OH)_2$ content comprised between 0.8 and 58% by weight, preferably between 0.9 and 53% by weight, based on the total weight of the compound and having a $Ca(OH)_2$ content comprised between 30 and 99.2% by weight, preferably between 35 and 99.1% by weight, based on the total weight of the mixed compound.

In this way, the $Mg(OH)_2$ proportion based on the mass of $Ca(OH)_2$ in the mixed compound according to the invention is comprised between 0.8 and 200%. Preferably, this proportion is comprised between 5 and 80%, in particular between 10 and 60% and in a particular case between 30 and 50%. Conversely, the $Ca(OH)_2$ proportion based on the $Mg(OH)_2$ mass in the mixed compound according to the invention is then comprised between 50 and 12,500%. Preferably, it is comprised between 125 and 2,000%, in particular between 165 and 1,000% and in a particular case between 200 and 350%.

More particularly, the compound according to the invention obtained via a quasi-dry route has a BET specific surface area comprised between 20 and 50 $m^2/g$, preferably greater than or equal to 25 $m^2/g$ and greater than or equal to 30 $m^2/g$, in particular greater than or equal to 35 $m^2/g$.

Preferably, in a particularly advantageous embodiment, the mixed compound of the quasi-dry route according to the invention has a BJH porous volume comprised between 0.10 and 0.25 $cm^3/g$, preferably greater than or equal to 0.11 $cm^3/g$ and advantageously greater than or equal to 0.13 $cm^3/g$, in particular greater than or equal to 0.15 $cm^3/g$.

Other embodiments of the mixed compound according to the invention are indicated in the appended claims.

Other features, details and advantages of the invention will become apparent from the description given hereafter, not as a limitation and with reference to the appended drawings and examples.

In the figures, identical or similar elements bear the same references.

Figure 1:
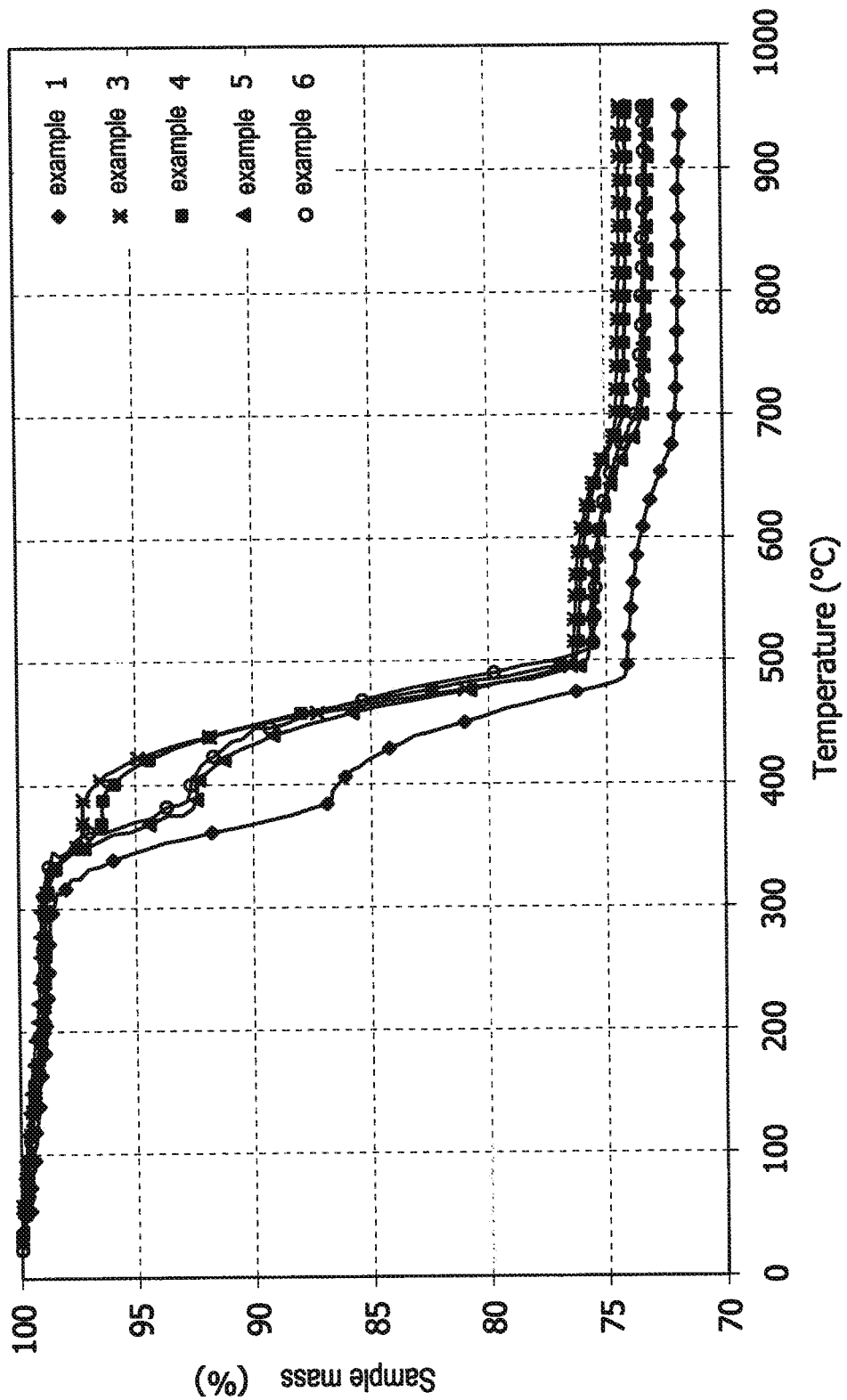
FIG. 1 is a graph showing the thermogravimetric curves recorded for the products of Examples 1 and then 3 to 6 (temperature from 20 to 950° C. with a ramp of 2° C./min, in air).

The method according to present invention may be described in different successive steps summarised as follows:
 i) preparation of a $Mg(OH)_2$ milk, optionally carried out in an independent way;
 ii) hydration of quicklime with the thereby prepared $Mg(OH)_2$ milk;
 iii) optional drying and optional de-agglomeration of the product, in the case of slaking with an excess of water
 iv) grain size control Step ii) for hydration of quicklime is carried out in a quite standard hydrator for slaking quicklime via a dry route.

In the method according to the invention, the hydrator may either be a single-stage hydrator, i.e. consisting of a single horizontal cylindrical reactor equipped with a central axis and stirring vanes, this reactor may either be provided or not with another horizontal cylinder used as a pre-mixer, or a multi-stage hydrator for example consisting of three successive horizontal reactors with increasing diameter, in which the product gradually falls during the hydration reaction.

The hydrator is fed with powdery quicklime, having a particle size comprised between 20 μm and 10 mm, preferably <5 mm, preferably <2 mm. The quicklimes are customarily characterized by their chemical purity and by their reactivity.

By high purity, is meant a low level of impurities, i.e. generally less than 5%, advantageously less than 4% by weight and preferably less than 3%, or even less than 2% by weight of conventional impurities which are found at the beginning in the limestone (MgO, $SiO_2$, $Al_2O_3$, . . . ), but also a high available lime content. The term <<available lime>> commonly represents the fraction of quicklime which is actually in the form of CaO and/or $Ca(OH)_2$ according to the standard EN 459-2: 2010 paragraph 5.8 or ASTM C25 standard of 1994. This excludes all the other possible forms of calcium such as the unfired substances ($CaCO_3$) or the compounds of the calcium silicate or aluminate types. The quicklimes used in the method according to the invention contain more than 90% by weight, advantageously more than 93% by weight, preferably more than 96% by weight and more advantageously more than 97% by weight of available lime. The proportion of unfired substances in the quicklimes used in the method according to the invention is normally less than 3%, advantageously less than 2%, preferably less than 1% by weight.

The reactivity of quicklime is characterized by the reactivity test described in the EN 459-2: 2010 paragraph 6.6 standard and in particular by the value of $t_{60}$. The limes used in the method according to the invention have a $t_{60}$ in the range from 0.3 to 8 minutes, preferably comprised between 0.5 and 5 minutes.

The quicklime flow rate used in the method according to the invention is similar to the quicklime flow rate customarily used for slaking in a conventional dry route during which the lime is only slaked with water with the purpose of producing a hydrated and powdery lime.

The $Mg(OH)_2$ milk flow rate in the method according to the invention varies according to the humidity level of $Mg(OH)_2$ reserved for the final product. At the outlet of the hydrator, the humidity of the product is comprised between 1 and 30% by weight. The more humid is the product which leaves the hydrator, the higher will be its specific surface area and its porous volume.

The final humidity of the product at the outlet of the hydrator is set according to the desired specific surface area and porous volume. The amount of water to be added to the quicklime for obtaining this humidity is then determined on taking into account the evaporation related to the exothermic nature of the quicklime hydration reaction. All the water required for hydrating the quicklime is brought by the $Mg(OH)_2$ milk. Next, depending on the desired respective proportions of $Ca(OH)_2$ and $Mg(OH)_2$, in the final product, the amount of $Mg(OH)_2$ to be added to the quicklime is calculated.

For a given hydration duration, it is then possible to calculate the amount of water and the amount of $Mg(OH)_2$ to be added to the quicklime amount which will be introduced into the hydrator. These amounts of water and of $Mg(OH)_2$ are put into contact before hydration, either by using a pre-existing (either diluted or not) $Mg(OH)_2$ milk in order to have the desired masses of water and of the $Mg(OH)_2$, or by dispersing the desired amount of $Mg(OH)_2$ powder into the desired amount of water. The thereby prepared milk is well homogenized during its preparation and then it is pumped in order to be injected into the hydrator, on the quicklime, either through simple orifices, or through spray nozzles adapted to the diameter of the $Mg(OH)_2$ particles in order to avoid clogging of the latter. During the whole hydration duration, the $Mg(OH)_2$ milk is maintained with stirring in order to avoid any sedimentation of $Mg(OH)_2$ particles. Regular samplings are carried out at the output of the hydrator and the humidity of these samples is measured. If this humidity corresponds to the desired humidity, no additional adjustment is required. If this humidity is too low, it is possible to increase the $Mg(OH)_2$ milk flow rate or to decrease the quicklime flow rate. If the humidity is too high, the $Mg(OH)_2$ milk flow rate may be decreased or that of quicklime may be increased.

If the product which leaves the hydrator has a humidity of less than 2% or even less than 4%, it may directly pass to the grain size control step iv).

On the other hand, if its humidity is comprised between 4 and 30%, the product has to be dried. It has to be de-agglomerated at the same time since such an excess of humidity leads to more or less pronounced agglomeration of the calcium hydroxide particles ($Ca(OH)_2$). This drying and de-agglomeration step is carried out industrially, preferably in a milling machine of the <<cage mill>> type. Other pieces of equipment, notably of the <<flash dryer>> type may be used. After this step, the product should contain less than 2% humidity, preferably less than 1% humidity and its particles should have a size of less than 1 mm, preferably less than 500 µm and advantageously less than 200 µm, which means that $d_{97}$ has to be less than the aforementioned sizes.

In most cases, the hydrated limes or the semi-hydrated or totally standard hydrated dolomites pass through a grain size control before being used in the various applications. This grain size control gives the possibility of removing the coarsest particles (notably the unfired substances) in order to obtain a reactive hydrate for the contemplated application. In the case of the method according to the invention, a similar grain size control step is desirable. This step is carried out industrially in air separators; it may be performed by sifting. The cut-off is generally made with the goal of having a product <250 µm, preferably <200 µm, preferably <90 µm, or even sometimes <60 µm.

The product obtained with the method according to the invention is a mixed product based on calcium and magnesium, both of these elements being found in a large majority in their hydroxide forms ($Ca(OH)_2$ and $Mg(OH)_2$). The $Mg(OH)_2$ which is found in the final product from the method according to the invention has the same characteristics as before the hydration when it is put in the form of milk. Indeed, the $Mg(OH)_2$ is not altered during the hydration reaction and therefore retains the same criteria of chemical purity and porosity as those described above. The $Ca(OH)_2$ which is found in the final product as for it is the product of the hydration reaction which occurs between the quicklime and the water brought into the hydrator by the $Mg(OH)_2$ milk.

The final product may be described by a general formula of the type $xCa(OH)_2 \cdot yMg(OH)_2 \cdot zI$, $Ca(OH)_2$ in majority representing said calcium phase and $Mg(OH)_2$ representing the said magnesium phase. Both of these phases are intimately bound and with a homogeneous volume distribution. X, y and z are weight fractions. Y is more particularly comprised between 0.4 and 58%, preferably between 3 and 53%, advantageously between 5 and 44% and more advantageously between 10 and 30%. However, it is important to note that the sum of x and y is comprised between 88 and 100% by weight based on the total weight of the mixed compound and is typically not equal to 100%. Indeed, in addition to the ultra-majority fractions $Ca(OH)_2$ and $Mg(OH)_2$, the final product contains impurities brought by the $Mg(OH)_2$ milk as well as impurities and unfired substances ($CaCO_3$) brought by the quicklime represented by I. Moreover, it is possible that the hydration of the quicklime is not complete in the method according to the invention, thereby leading to the presence of residual quicklime CaO in the final product. The residual CaO content in the final product is, however, as low as possible and is also comprised in I, which is comprised between 0.1 and 3%, preferably less than 2% and advantageously less than 1% by weight. The MgO content, also comprised in I, in the final product, as for it, is less than 2%, preferably less than 1% and in particular less than 0.5% by weight. Preferentially, the contents of impurities and unfired substances are as low as possible and the sum of x and y is greater than 90%, preferably 92%, advantageously 95%, in particular 97% and extremely preferentially greater than 98%. It should be noted that when the product is obtained through a quasi-dry route, there is partial carbonation of the calcium phase during the drying of the mixed compound according to present invention, which increases the value of the weight fraction z as compared with a mixed compound obtained via a dry route.

In practice, the proportion y of $Mg(OH)_2$ in the final product depends on the humidity of the product at the outlet of the hydrator. Indeed, it has been stated above that all the water required for the hydration reaction is brought by the $Mg(OH)_2$ milk which has a maximum concentration of the order of 55% by weight. Therefore, in order to reach a given humidity at the outlet of the hydrator, a given amount of water has to be added to the quicklime for the hydration reaction and the amount of added $Mg(OH)_2$ is then at most equal to 122% of this amount of water (since the milk contains at most 55% of $Mg(OH)_2$ and 45% of water). The proportions of y expressed in the paragraph above correspond to a product which at the outlet of the hydrator has a humidity comprised between 1 and 30% by weight.

As regards this humidity, it is comprised between 1 and 30% by weight at the outlet of the hydrator, with however two preferred families of products.

The first family of products according to the invention has a humidity at the outlet of the hydrator which is less than 4% by weight, preferably less than 2% by weight and preferably less than 1% by weight. This family corresponds to the family of dry hydrates which do not require drying before the grain size control and packaging steps. Taking into account the remark above pointing out the dependency of the $Mg(OH)_2$ proportion on the humidity of the product at the outlet of the hydrator, the products of this family contain between 0.4 and 48% of $Mg(OH)_2$ and therefore between 40 and 99.6% of $Ca(OH)_2$. Preferably, the $Mg(OH)_2$ proportion in the final product is comprised between 0.5 and 43% by weight, in particular between 0.6 and 40% by weight. That of $Ca(OH)_2$ is therefore preferably comprised between 45 and 99.5% by weight, preferably between 48 and 99.4% by weight (for a sum of x and y ranging from 88 to 100%). The products of this family have a specific surface area and a porous volume which are of the same order of magnitude as those of customary hydrated limes obtained via a standard dry route. After the grain size control step, the whole of the particles of the products of this family have a size of <250 µm, preferably <200 µm, advantageously <90 µm, or even sometimes <60 µm. This means that $d_{97}$ is less than the aforementioned sizes.

The second family of preferred products according to the invention has a humidity at the outlet of the hydrator comprised between 15 and 30% by weight, preferably greater than 17%, in particular greater than 19%, preferably less than 25%, in particular less than 22%. This family corresponds to the family of products which require a preliminary drying step before the grain size control and packaging steps. At the end of the drying step, the products of this family ideally have a humidity of less than 2% by weight, preferably less than 1% by weight. The drying may be achieved simultaneously or before a de-agglomeration step generally followed by a grain size control step such as has been described in the part relating to the method above, the whole of the particles of the products of this family then have, at the end of the method according to the invention, a size of <250 µm, preferably <200 µm, advantageously <90µ, or even <60 µm. This means that $d_{97}$ is less than the aforementioned sizes.

Taking into account the remark above pointing out the dependency of the $Mg(OH)_2$ proportion on the humidity of the product at the outlet of the hydrator, the products of this family contain, once they are dried, between 0.8 and 58% of $Mg(OH)_2$ and therefore between 30 and 99.2% of $Ca(OH)_2$. Preferably, the proportion of $Mg(OH)_2$ in the final product is comprised between 0.9 and 53% by weight, preferably between 1.0 and 51% by weight, that of $Ca(OH)_2$ is therefore preferably comprised between 35 and 99.1% by weight, preferably between 37 and 99.0% by weight (for a sum of x and y ranging from 88 to 100%). The products of this family have a high specific surface area and a high porous volume. Their specific surface area is greater than 20 m²/g, preferably greater than 25 m²/g, in particular greater than 30 m²/g and less than 50 m²/g, in particular less than 45 m²/g, notably less than 40 m²/g, or even less than 35 m²/g. Their porous volume is greater than 0.10 cm³/g, preferably greater than 0.11 cm³/g, advantageously greater than 0.13 cm³/g and less than 0.25 cm³/g, in particular less than 0.20 cm³/g, notably less than 0.18 cm³/g, or even less than 0.16 cm³/g.

For both of these families of products, the specific surface area and the porous volume depend on the proportions x and y of $Ca(OH)_2$ and of $Mg(OH)_2$. Indeed, the specific surface area and the porous volume of $Mg(OH)_2$ are not modified during the reaction described in the method according to the invention and therefore remain low. Regardless of the humidity of the product at the outlet of the hydrator, the specific surface area and the porous volume of $Ca(OH)_2$ formed during the reaction described by the method according to the invention are higher than those of $Mg(OH)_2$ involved in the method. Therefore, the greater the proportion of $Mg(OH)_2$ in the product, the lower are the specific surface area and the porous volume of the final product based on $Ca(OH)_2$ and on $Mg(OH)_2$. This reduction effect of the specific surface area and of the porous volume of the product with the increase of the $Mg(OH)_2$ proportion is all the more pronounced in the case of the second family of products. Indeed, when the humidity at the outlet of the hydrator is high, the specific surface area and the porous volume of the $Ca(OH)_2$ formed during hydration of the quicklime are high and each percent of $Mg(OH)_2$ with low specific surface areas and porous volume added to $Ca(OH)_2$ of this type for this mixture leads to a proportional decrease in the specific surface area and in the porous volume.

In every case, adding $Mg(OH)_2$ in the form of a homogenous suspension in the hydrator during the hydration reaction of CaO into $Ca(OH)_2$ gives the possibility of obtaining an intimate mixture between the $Ca(OH)_2$ and $Mg(OH)_2$ compounds, a clearly more intimate mixture than in the case of simple physical mixtures of $Ca(OH)_2$ and of $Mg(OH)_2$.

EXAMPLES

The laboratory hydrator used for producing all the examples shown in the following is a single-stage hydrator. It appears as a horizontal cylinder measuring about 80 cm in length on 25 cm of diameter. These proportions correspond to the proportions of industrial single-stage hydrators and these dimensions are 6 to 7 times smaller than the dimensions of industrial hydrators. This cylinder is provided with a jacket giving the possibility of controlling the temperature by circulation of a hot or cold fluid. Inside the hydrator, an axis provided with vanes is used for homogenizing the product during hydration but also for pushing it from the inlet (at one end) to the outlet (at the other end of the cylinder). The lime is introduced into the hydrator through a worm screw, calibrated beforehand before adjusting the quicklime flow rate. The $Mg(OH)_2$ milk, as for it, is introduced into the hydrator at two orifices each measuring about 5 mm in diameter, located on the lid of the hydrator, close to the intake of quicklime. When the product has covered the whole length of the hydrator, it leaves it simply by overflowing. Generally, the filling level of the hydrator is of the order of 50% by volume, i.e. that the bed of product reaches about the height of the axis. For all the examples below, the hydrator is pre-heated to 70-80° C. by circulating water at 90° C. in the jacket. This pre-heating gives the possibility of simulating starting conditions, industrially acquired by the continuous operation and avoids condensation of the steam produced by the hydration reaction of quicklime on the walls of the hydrator when the latter are cold. The jacket is then emptied when the hydration reaction begins in the hydrator.

In the case of hydrations with an excess of water (quasi-dry route of Examples 1 to 6), the drilling time of the product in the hydrator is of the order of 15 minutes. In the case of hydrations via a dry route (Examples 7 to 9), the drilling time is longer, of the order of about 25 minutes.

Example 1

Production of a Totally Hydrated Mixed Compound with High Specific Surface Area and Porous Volume, Having a Molar Ratio Ca/Mg Close to 1

A quicklime no. 1 (the properties of which are repeated in Table 1) is hydrated in the laboratory hydrator described above with a $Mg(OH)_2$ milk under particular conditions detailed below.

The quicklime flow rate is of 300 g/min, which corresponds theoretically to 396 g of $Ca(OH)_2$/min, i.e. 5.34 mol of $Ca(OH)_2$/min. 5.34 mol of $Mg(OH)_2$/min have then to be added, i.e. 312 g of $Mg(OH)_2$/min in order to obtain an equimolar mixed compound.

The $Mg(OH)_2$ used in this example is noted as $Mg(OH)_2$ source no. 1 (its main properties are described in Table 2), and appears initially as a milk containing 53% of solid material. Therefore 589 g/min of this milk have therefore to be added into the hydrator in order to obtain a $Ca(OH)_2$/$Mg(OH)_2$ ratio of about 1. However, with the purpose of developing porosity of the hydrate, an excess of water is required during the hydration reaction. In this particular case, the excess of water should give the possibility of obtaining at the outlet of the hydrator a product having a humidity comprised between 16 and 22%. The water introduced during the reaction by the 589 g/min of $Mg(OH)_2$ milk is not sufficient for reaching this humidity level, additional water has to be added. In practice, this water is added to the $Mg(OH)_2$ milk before its introduction into the hydrator.

The hydrator keeps operating under these operating conditions for 30 minutes, thus producing more than 25 kg of powdery humid product. During this production, several samplings were made in order to control the humidity of the product which is measured by the mass loss during fast drying at 150° C.

At the end of the production, the product is dried and de-agglomerated by a brief passage in a hot air current by means of a "spin flash dryer". The temperature perceived by the product is of the order of 130° C. Here there is no grain size control step. Once it is dried, the product is characterised by thermogravimetric analysis (from room temperature up to 950° C. with a rise in temperature at 2° C./min) which allows determination of the actual proportions of $Mg(OH)_2$ and $Ca(OH)_2$ in the product after the mass losses observed between 300 and 400° C. and then between 400 and 600° C. and which respectively correspond to dehydroxylations of $Mg(OH)_2$ and of $Ca(OH)_2$. The thermogravimetric curve recorded for this product is shown in FIG. 1. A nitrogen adsorption manometric measurement is also conducted after having carried out degassing of the products at 190° C. for several hours. This measurement allows determination of the specific surface area of the product by the BET method, the BJH method as for it allowing evaluation of the volume of the pores for which the size is comprised between 17 and 1000 Å.

All the results relative to this product are grouped in the first column of Table 3.

Example 2

Production of a Totally Hydrated Mixed Compound with High Specific Area and Porous Volume, Having a Ca/Mg Molar Ratio Close to 1

This example is quite comparable with Example 1. The only difference is that this time, the $Mg(OH)_2$ milk is diluted beforehand with a greater amount of water than the one added to the $Mg(OH)_2$ milk in Example 1, the goal being here to obtain at the outlet of the hydrator a humid product containing 26 to 28% of humidity and no longer only 16 to 22% as was the case in Example 1.

The thereby obtained product is dried and characterised in a similar way to the product of Example 1 and the results of the measurements appear in the second column of Table 3.

The excess of water used during the hydration reaction, as intended allows development of a high specific surface area and of a high porous volume. The product having a humidity from 26 to 28% (Example 2) has a specific surface area equivalent to that of the product for which the humidity at the outlet of the hydrator was 16-22% (Example 1); but, the porous volume is more developed in Example 2. A minimum amount of excess water is therefore required for developing porosity (humidity ≥15% at the outlet of the hydrator), but the amount of water does not require accurate control, if only a high specific surface area is sought. However, it should remain less than a limit (humidity ≤30%) in order to avoid the production of a pasty product and no longer powdery which would stick, notably in the hydrator.

Example 3

Production of a Totally Hydrated Mixed Compound with a High Specific Surface Area and Porous Volume, Containing about 5% of $Mg(OH)_2$ Based on the Mass of $Ca(OH)_2$ This example is strongly inspired from Example 1.

The quicklime flow rate remains 300 g/min as in the previous examples, which always corresponds theoretically to 396 g of $Ca(OH)_2$/min. About 20 g/min of $Mg(OH)_2$ then has to be added, i.e. about 38 g/min of $Mg(OH)_2$ milk with 53% of initial solid material. The water provided by this small amount of milk is very clearly insufficient for guaranteeing complete hydration of the lime and furthermore the development of the porosity of the hydrate. Water is then added in order to obtain at the outlet of the hydrator a product having a humidity of the order of 16 to 22%. In practice, this water is added to the $Mg(OH)_2$ suspension before its introduction into the hydrator.

The thereby obtained product is dried and characterised in a similar way to the product of Example 1. The thermogravimetric analysis curve is plotted in FIG. 1. The first mass loss (300-400° C.) is clearly smaller than the one observed for the sample of Example 1, which expresses, a lower proportion of $Mg(OH)_2$. The second mass loss (400-600° C.) is on the other hand more pronounced and indicates a greater proportion of $Ca(OH)_2$ as compared with the product of Example 1. The results of the different measurements are found in the third column of Table 3.

Example 4

Production of a Totally Hydrated Mixed Compound with High Specific Surface Area and Porous Volume, Containing about 10% of $Mg(OH)_2$ Based on the Mass of $Ca(OH)_2$ This example is comparable with Example 3, except for the $Mg(OH)_2$ percentage. The quicklime flow rate remains at 300 g/min, like in the previous examples, which always corresponds theoretically to 396 g of $Ca(OH)_2$/min. About 40 g/min of $Mg(OH)_2$, then has to be added, i.e. about 75 g/min of initial $Mg(OH)_2$ milk with 53% of solid material.

Water is then added in order to obtain at the outlet of the hydrator once again a product having humidity of the order of 16 to 22%. In practice, this water is added to the Mg(OH)$_2$ milk before its introduction into the hydrator.

The thereby obtained product is dried and characterised similarly to the product of Example 1. The thermogravimetric analysis curve is plotted in FIG. 1. This curve is very close to the curve corresponding to the product of Example 3. The slightly greater mass loss between 300 and 400° C. for the product of this Example 4 however expresses a higher proportion of Mg(OH)$_2$ than for the case of Example 3. The results of the different measurements are found in the fourth column of Table 3.

Example 5

Production of a Totally Hydrated Mixed Compound with High Specific Surface Area and Porous Volume, Containing about 30% of Mg(OH)$_2$ Based on the Mass of Ca(OH)$_2$ This example is comparable with Examples 3 and 4, except for the percentage of Mg(OH)$_2$.

The quicklime flow rate remains at 300 g/min, like in the previous examples, which always theoretically corresponds to 396 g of Ca(OH)$_2$/min. About 119 g/min of Mg(OH)$_2$ has then to be added i.e. about 225 g/min of initial Mg(OH)$_2$ milk with 53% of solid material. Water is then added in order to obtain at the outlet of the hydrator once again a product having a humidity of the order of 16 to 22%. In practice, this water is added to the Mg(OH)$_2$ milk before its introduction into the hydrator.

The thereby obtained product is dried and characterised in a similar way to the product of Example 1. The thermogravimetric analysis curve is plotted in FIG. 1. The mass lost between 300 and 400° is still greater than in the Examples 3 and 4, that between 400 and 600° C. being on the other hand smaller, which is expressed both by a higher proportion of Mg(OH)$_2$ and a lower proportion of Ca(OH)$_2$. The results of the different measurements are found in the fifth column of Table 3.

Example 6

Production of a Totally Hydrated Mixed Compound with High Specific Surface Area and Porous Volume, Containing about 30% of Mg(OH)$_2$ Based on the Mass of Ca(OH)$_2$ This example is comparable with Example 5. Nevertheless, the Mg(OH)$_2$ source noted as source no. 1 and used for Examples 1 to 5 is replaced here with a Mg(OH)$_2$ source no. 2 for which the main properties are indicated in Table 2. This time, the Mg(OH)$_2$ no longer appears as a milk but as a dry powder.

Like in Example 5 above, in order to obtain the desired proportions of Ca(OH)$_2$ and Mg(OH)$_2$, 119 g/min of Mg(OH)$_2$ has to be added for a quicklime flow rate of 300 g/min. A production of 30 minutes then corresponds to 3570 g of Mg(OH)$_2$. This amount of Mg(OH)$_2$ is mixed with a well-determined amount of water and this suspension is pumped and then introduced into the hydrator. The amount of water used for preparing this milk is such that the humidity of the product at the outlet of the hydrator has to be comprised as earlier between 16 and 22%.

The thereby obtained product is dried and characterised in a similar way to the product of Example 1. The thermogravimetric analysis curve is plotted in FIG. 1. The curve is quite comparable with the curve corresponding to the product of Example 5, expressing close compositions for both of these products in terms of Mg(OH)$_2$ and Ca(OH)$_2$ proportions. The results of the different measurements are found in the sixth column of Table 3.

Example 7

Production of a Totally Hydrated Mixed Compound, Containing about 5% of Mg(OH)$_2$ Based on the Mass of Ca(OH)$_2$ This time, the product has no specificity in terms of specific surface area and porous volume as compared with standard dry hydrates, whether they are purely calcium (slaked lime) or dolomites.

In order to attain this goal, the quicklime no. 2 (described in Table 1) is used instead of the quicklime no. 1 used in the previous examples. Its flow rate is adjusted this time to 200 g/min, only, which theoretically corresponds to 264 g of Ca(OH)$_2$/min. About 13 g/min of Mg(OH)$_2$ then has to be added. The Mg(OH)$_2$ source is again here source no. 1, i.e. the milk containing 53% by mass of Mg(OH)$_2$. Introducing into the hydrator 13 g/min of Mg(OH)$_2$ amounts to introducing therein 24.5 g of Mg(OH)$_2$ milk with 53% of initial solid material. The water brought by this small amount of milk is very clearly insufficient for guaranteeing complete hydration of the lime even if there is no intention in this example to develop the porosity of the hydrate. Water is then added in order to obtain at the outlet of the hydrator a product having humidity of the order of 1 to 4%. In practice, this water is added to the suspension of Mg(OH)$_2$ before introducing it into the hydrator.

Unlike the previous examples, the product is neither dried nor de-agglomerated; it is characterised in a similar way to the product of Example 1. The thermogravimetric analysis curve is plotted on FIG. 2. The measurement was conducted this time with a heating rate of 5° C./min instead of the 2° C./min used for characterising the products of the examples above. Accordingly, the decomposition of Mg(OH)$_2$ occurs this time between 350 and 450° C., that of Ca(OH)$_2$ between 450 and 650° C. The results of the different measurements are found in the seventh column of Table 3.

Example 8

Production of a Totally Hydrated Mixed Compound Containing about 10% of Mg(OH)$_2$ Based on the Mass of Ca(OH)$_2$ This example is comparable with Example 7, except for the percentage of Mg(OH)$_2$.

The quicklime flow rate is maintained at 200 g/min, which still theoretically corresponds to 264 g of Ca(OH)$_2$/min. About 26 g/min of Mg(OH)$_2$ has then to be added, i.e. 49 g of Mg(OH)$_2$ milk with 53% of initial solid material. The water brought by this small amount of milk is very clearly insufficient for guaranteeing complete hydration of the lime even if there is no intention in this example of developing the porosity of the hydrate. Water is then added in order to obtain at the outlet of the hydrator, a product having a humidity of the order of 1 to 4%. In practice, this water is added to the Mg(OH)$_2$ milk before its introduction into the hydrator.

The thereby obtained product is characterised in a similar way to the product of Example 1. The thermogravimetric analysis curve is plotted in FIG. 2. As earlier for the products of FIG. 1, the increase in the first mass loss (350-450° C.) and the reduction in the second mass loss (450-650° C.) as compared with the curve of Example 7, indicate an increase in the proportion of $Mg(OH)_2$ in parallel with a reduction of that of $Ca(OH)_2$. The results of the different measurements are found in the eighth column of Table 3.

Example 9

Production of a Totally Hydrated Mixed Compound Containing about 30% of $Mg(OH)_2$ Based on the Mass of $Ca(OH)_2$ This example is comparable with Examples 7 and 8, except for the percentage of $Mg(OH)_2$.

The quicklime flow rate is maintained at 200 g/min, which still corresponds theoretically to 264 g of $Ca(OH)_2$/min. About 79 g/min of $Mg(OH)_2$ has then to be added, i.e. 149 g of $Mg(OH)_2$ milk with 53% of initial solid material. Water is then added in order to obtain at the outlet of the hydrator a product having a humidity of the order of 1 to 4%. In practice, this water is added to the $Mg(OH)_2$ milk before its introduction into the hydrator.

The thereby obtained product is characterised in a similar way to the product of Example 1. The thermogravimetric analysis curve is plotted in FIG. 2. The observations made in Example 8 remain valid with a still more pronounced increase in the mass loss between 350 and 450° C. and a greater reduction in the mass loss between 450 and 650° C. The results of the different measurements are found in the last column of Table 3.

Figure 2:
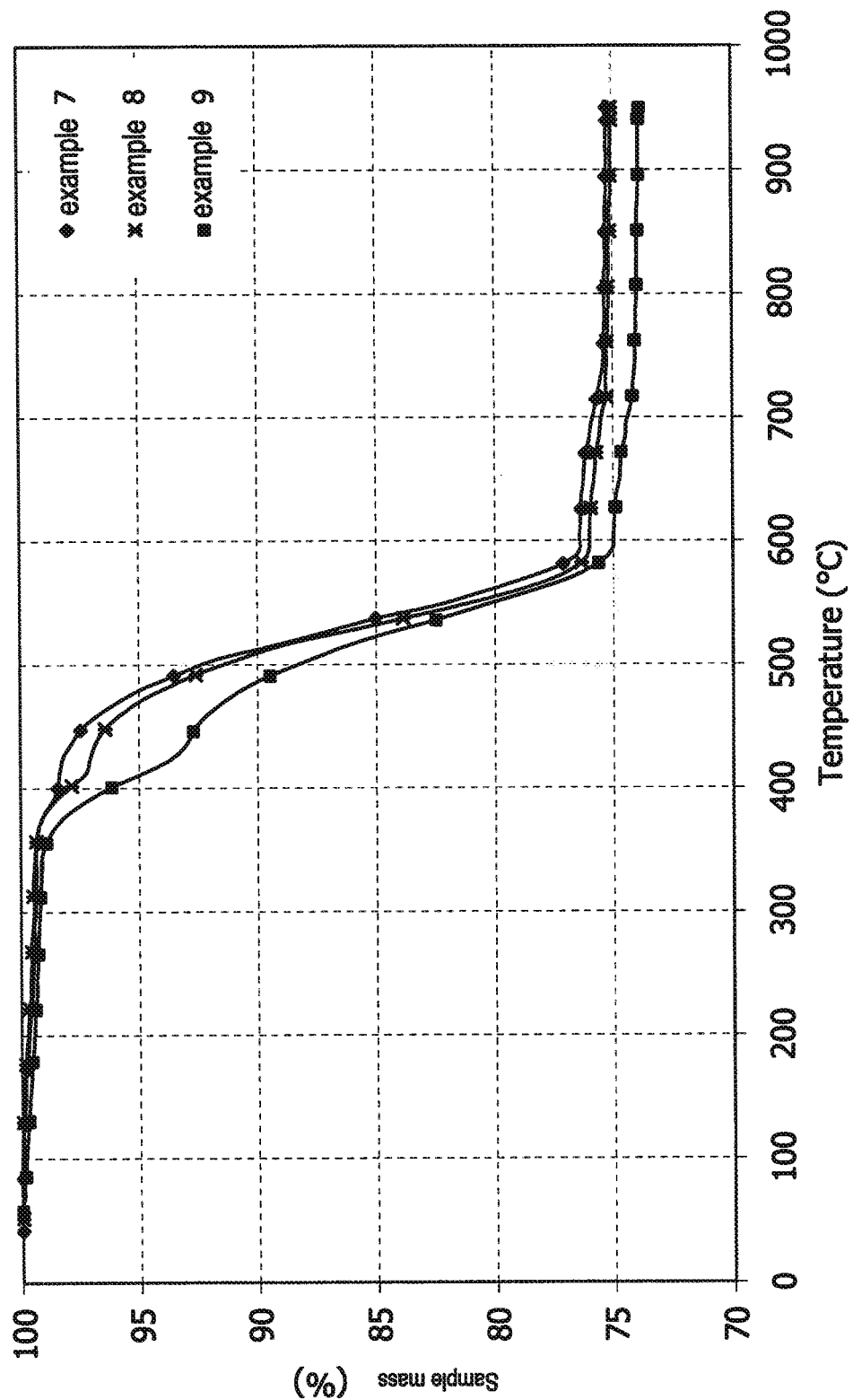
FIG. 2 is a graph showing the thermogravimetric curves recorded for the products of Examples 7 to 9 (temperature from 20 to 950° C. with a ramp of 5° C./min, in air).

Generally, Table 3 shows that the proportions of $Mg(OH)_2$ expressed relatively to the proportions of $Ca(OH)_2$ found according to the thermogravimetric curves of FIGS. 1 and 2 are close to the expected values. In the case of hydrations via a dry route (Examples 7 to 9), the actual proportions are quite slightly less than the desired proportions. This deviation may be explained by a significant formation of steam in the case of hydrations via a dry route, greater than in the case of hydration with an excess of water of Examples 1 to 6. Certain fine particles, mainly $Mg(OH)_2$ for which the grain size is very fine, are found in suspension in this steam and are extracted from the hydrator by the steam extraction system, whence the <<loss>> of a small amount of $Mg(OH)_2$ during the reaction. Logically, these <<losses>> are less significant in the case of hydrations with an excess of water (Examples 1 to 6) during which the temperature is lower and the steam production is lower and the actual values are consequently closer in Examples 1 to 6 to the desired values than in the Examples 7 to 9.

Moreover, it is obvious according to the results of Table 3 that the hydrations with an excess amount of water (Examples 1 to 6) lead to products with high specific area and porous volume while hydrations via a dry route lead to products for which the porosity is clearly lower. The specific surface of the products depends on the proportion of $Mg(OH)_2$: the higher the proportion of $Mg(OH)_2$ as compared with $Ca(OH)_2$ the lower is the specific surface area of the product. The differences are more pronounced in the case of hydrations with excessive water (Examples 1 to 6), for which the products may be considered as composites or at the very least as intimate mixtures between the initial $Mg(OH)_2$ and hydrated lime $Ca(OH)_2$ with a high specific surface area (about 40 m$^2$/g).

Comparative Example 1

Example 1 is reproduced, but this time the $Mg(OH)_2$ source no. 2 which appears as a powder is used instead of $Mg(OH)_2$ source no. 1 which, as for it, appears as a milk. Instead of dispersing the $Mg(OH)_2$ source no. 2 in water in order to prepare a milk like in Example 6, the $Mg(OH)_2$ source no. 2 is this time mixed with quicklime, the quicklime/$Mg(OH)_2$ mixture being introduced into the hydrator instead and in the place of the quicklime and the hydration of this mixture is only ensured with water.

The quicklime no. 1 is used for this example and its flow rate is set to 300 g/min. Like in Example 1, the $Mg(OH)_2$ flow rate required for producing a product having a Ca/Mg ratio close to molarity is then 312 g/min. For a total production of 30 min, these are then 9000 g of quicklime and 9360 g of $Mg(OH)_2$ as a powder which are mixed in a laboratory mixer and then introduced into the metering device customarily used for feeding the laboratory hydrator with quicklime. This metering device is calibrated so as to introduce into the hydrator, 612 g of quicklime+$Mg(OH)_2$ mixture per minute. The amount of water to be added into the hydrator with the purpose of totally hydrating CaO and of producing a calcium-magnesium product with high specific surface area and high porous volume is determined so that the product which leaves the hydrator has humidity of the order of 15%.

At the end of the production, the same drying, de-agglomeration steps and the same characterisations as those described in Example 1, are applied. According to the thermogravimetric results allowing determination of the mass proportions of $Ca(OH)_2$ and of $Mg(OH)_2$ in the final product, this final product after drying has a Ca/Mg molar ratio of 1.21 instead of the ratio of 1 which was desirable. In the example above, the same hydration aiming at producing a comparable equimolar product by introducing $Mg(OH)_2$ into the hydrator as a milk, however, led to a product very close to expectations for which the molar ratio Ca/Mg is 1.01.

Accordingly, it seems that introduction into the hydrator of the $Mg(OH)_2$ source as a milk is clearly better than its introduction as a powder mixed with quicklime. On one hand, the mixture of powders is complicated to prepare for guaranteeing perfect homogeneity thereof. On the other hand, when $Mg(OH)_2$ arrives already dry into the hydrator as a powder, it is possible that the phenomenon described above occurs: actually it may be contemplated that the fine $Mg(OH)_2$ powder particles are found suspended in the steam generated by hydration of the quicklime and are extracted from the hydrator by the steam extraction system, thus leading to the "loss" of $Mg(OH)_2$. When $Mg(OH)_2$ is brought into the hydrator as a milk, the particles, which are as fine as in the $Mg(OH)_2$ powder are, however, coated with water and have to be dried in order to be found in suspension in the steam, which limits the "losses" of $Mg(OH)_2$ by the extraction system.

It is quite understood that the present invention is by no means limited to the embodiments described above and that many modifications may be brought thereto without departing from the scope of the appended claims.

TABLE 1

| Quicklime | No. 1 | No. 2 |
|---|---|---|
| Particle size | <90 μm | <10 mm |
| Available CaO (mass %.) | 97.29 | 96.92 |
| $CaCO_3$ (mass %.) | 0.57 | 0.60 |
| MgO (mass %.) | 1.12 | 0.88 |
| $Al_2O_3$ (mass %.) | 0.18 | 0.22 |
| $SiO_2$ (mass %.) | 0.25 | 0.67 |
| $Fe_2O_3$ (mass %.) | 0.18 | 0.20 |

TABLE 1-continued

| Quicklime | No. 1 | No. 2 |
|---|---|---|
| MnO (mass %.) | 0.04 | 0.00 |
| SO$_3$ (mass %.) | 0.04 | 0.23 |
| T$_{60}$ (min.) averaged over 3 samples | 0.7 (±0.05) | 4.2 (±0.05) |

TABLE 2

| Mg(OH)$_2$ source | No. 1 | No. 2 |
|---|---|---|
| Initial state | Suspension, 53% by mass | Powder |
| Mg(OH)$_2$ (mass %.) | 96.0 | 99.7 |
| CaO (mass %.) | 0.62 | 0.09 |

TABLE 2-continued

| Mg(OH)$_2$ source | No. 1 | No. 2 |
|---|---|---|
| Al$_2$O$_3$ (mass %.) | 0.10 | 0.06 |
| SiO$_2$ (mass %.) | 0.11 | 0.03 |
| Fe$_2$O$_3$ (mass %.) | 0.37 | 0.01 |
| MnO (mass %.) | 0.07 | 0.00 |
| SO$_3$ (mass %.) | 0.01 | 0.11 |
| Cl (mass %.) | 0.43 | 0.02 |
| D$_{10}$ (μm) | 0.88 | 1.21 |
| D$_{50}$ (μm) | 5.04 | 3.93 |
| D$_{90}$ (μm) | 9.59 | 19.5 |
| Specific surface area (m$^2$/g) | 8.1 | 5.5-5.2 |
| Pore volume N$_2$ | 0.034 | 0.023- |

TABLE 3

| | Ex. No. | | | | |
|---|---|---|---|---|---|
| | 1 | 2 | 3 | 4 | 5 |
| Slaked lime | no. 1 | no. 1 | no. 1 | no. 1 | no. 1 |
| Source: Mg(OH)$_2$ | no. 1 | no. 1 | no. 1 | no. 1 | no. 1 |
| Humidity of the product at the hydrator outlet (%) | 16-22 | 22-28 | 16-22 | 16-22 | 16-22 |
| Desired Ca/Mg mol. ratio | 1 | 1 | | | |
| Actual Ca/Mg mol. ratio | 1.01 ± 0.02 | 0.97 ± 0.02 | | | |
| % Mg(OH)$_2$ relatively to the desired Ca(OH)$_2$ | (78.7) | (78.7) | 5 | 10 | 30 |
| % Mg(OH)$_2$ relatively to the actual Ca(OH)$_2$ | (77.5) | (80.9) | 6.3 ± 0.5 | 9.7 ± 0.5 | 31.8 ± 0.5 |
| Actual % Mg(OH)$_2$ in the final product (y) | 39.7 ± 0.5 | 40.6 ± 0.5 | 5.4 ± 0.5 | 8.1 ± 0.5 | 21.9 ± 0.5 |
| Actual % Ca(OH)$_2$ in the final product (x) | 51.2 ± 0.5 | 50.1 ± 0.5 | 86.1 ± 0.5 | 83.3 ± 0.5 | 68.7 ± 0.5 |
| Sum of actual Ca(OH)$_2$ + Mg(OH)$_2$ (x + y) | 90.9 ± 0.5 | 90.7 ± 0.5 | 91.5 ± 0.5 | 91.4 ± 0.5 | 90.6 ± 0.5 |
| Specific surface area by the BET method (m$^2$/g) | 25.0 ± 0.2 | 25.1 ± 0.2 | 41.6 ± 0.2 | 40.4 ± 0.2 | 32.0 ± 0.2 |
| Volume of 17-1,000 Å pores by the BJH method (cm$^3$/g) | 0.116 ± 0.020 | 0.145 ± 0.020 | 00.162 ± 0.020 | 0.174 ± 0.020 | 0.150 ± 0.020 |

| | Ex. No. | | | |
|---|---|---|---|---|
| | 6 | 7 | 8 | 9 |
| Slaked lime | no. 1 | no. 2 | no. 2 | no. 2 |
| Source: Mg(OH)$_2$ | no. 2 | no. 1 | no. 1 | no. 1 |
| Humidity of the product at the hydrator outlet (%) | 16-22 | 1-4 | 1-4 | 1-4 |
| Desired Ca/Mg mol. ratio | | | | |
| Actual Ca/Mg mol. ratio | | | | |
| % Mg(OH)$_2$ relatively to the desired Ca(OH)$_2$ | 30 | 5 | 10 | 30 |
| % Mg(OH)$_2$ | 29.1 ± 0.5 | 3.6 ± 0.5 | 8.4 ± 0.5 | 29.8 ± 0.5 |

TABLE 3-continued

| | | | | |
|---|---|---|---|---|
| relatively to the actual Ca(OH)$_2$ | | | | |
| Actual % Mg(OH)$_2$ in the final product (y) | 20.5 ± 0.5 | 3.3 ± 0.5 | 7.4 ± 0.5 | 21.6 ± 0.5 |
| Actual % Ca(OH)$_2$ in the final product (x) | 70.5 ± 0.5 | 90.8 ± 0.5 | 87.5 ± 0.5 | 72.6 ± 0.5 |
| Sum of actual Ca(OH)$_2$ + Mg(OH)$_2$ (x + y) | 91.0 ± 0.5 | 94.1 ± 0.5 | 94.9 ± 0.5 | 94.2 ± 0.5 |
| Specific surface area by the BET method (m$^2$/g) | 31.6 ± 0.2 | 16.5 ± 0.2 | 15.8 ± 0.2 | 15.1 ± 0.2 |
| Volume of 17-1,000 Å pores by the BJH method (cm$^3$/g) | 0.137 ± 0.020 | 0.054 ± 0.020 | 0.056 ± 0.020 | 0.055 ± 0.020 |

The invention claimed is:

1. A method for manufacturing a composition of mixed calcium and magnesium hydrates comprising slaking of quicklime with, an aqueous medium in a hydrator having an inlet and an outlet, with, formation of solid particles, characterized in that said aqueous medium is a suspension of magnesium hydroxide provided before the slaking of the quicklime for forming said solid particles of mixed hydrates of the formula xCa(OH)$_2$.yMg(OH)$_2$.zI in a solid and powdery form having a humidity of less than 4% by weight at the outlet of the hydrator, and comprising a calcium phase and a magnesium phase, intimately bound and with a homogenous volume distribution, a formula in which x, y and a are weight fractions with x+y comprised between 88 and 100% by weight based on the total weight of the mixed hydrates, in which I represents impurities and wherein the proportion of the Ca(OH)$_2$ based on the mass of Mg(OH)$_2$ in the mixed hydrates is comprised between 80 and 25,000%.

2. The method according to claim 1, wherein, before said slaking of quicklime, said magnesium hydroxide suspension is prepared by suspending in water a predetermined amount of magnesium hydroxide comprised between 1 and 55% by weight, based on the weight of said magnesium hydroxide suspension.

3. The method according to claim 1, further comprising drying said solid particles, optionally followed by a de-agglomeration step.

4. The method according to claim 1, further comprising determining a grain size cut-off.

5. The method according to claim 1, wherein said magnesium hydroxide amount is comprised between 5 and 53% by weight, based on the total weight of the magnesium hydroxide suspension.

6. The method according to claim 1, wherein said aqueous medium further comprises an additive which increases the specific surface area of Ca(OH)$_2$ particles of said mixed hydrates.

7. A method for manufacturing a composition of mixed calcium and magnesium hydrates, said method comprising slaking of quicklime with an aqueous medium in a hydrator having an inlet and an outlet, with formation of solid particles, characterized in that said aqueous medium is a suspension of magnesium hydroxide provided before the slaking of the quicklime for forming said solid particles of mixed hydrates of the formula xCa(OH)$_2$.yMg(OH)$_2$.zI in a solid and powdery form having a humidity comprised between 15 and 30% by mass at the outlet of the hydrator, and comprising a calcium phase and, a magnesium phase, intimately bound and with a homogenous volume distribution, a formula in which x, y and z are weight fractions with x+y comprised between 88 and 100% by weight based on the total weight of the mixed hydrates, in which I represents impurities and wherein the proportion of Ca(OH)$_2$ based on the mass of Mg(OH)$_2$ in the mixed hydrates is comprised between 50 and 12,500%.

8. The method according, to claim 7, wherein, before said slaking of quicklime, said magnesium hydroxide suspension is prepared by suspending in water a predetermined amount of magnesium hydroxide comprised between 1 and 55% by weight, based on the weight of said magnesium hydroxide suspension.

9. The method according to claim 7, further comprising drying said solid particles, optionally followed by a de-agglomeration step.

10. The method according to claim 7, further comprising determining s grain size cut-off.

11. The method according to claim 7, wherein said magnesium hydroxide amount is comprised between 5 and 53% by weight, based on the total weight of the magnesium hydroxide suspension.

12. The method according to claim 7, wherein said aqueous medium further comprises an additive which increases the specific surface area of Ca(OH)$_2$ particles of said mixed hydrates.

* * * * *